Patented May 12, 1953

2,638,421

UNITED STATES PATENT OFFICE 2,638,421

PROCESS OF AGGLOMERATING PARTICLES OF WOOD AND THE PRODUCT THEREOF

Jean Paul Justin Serres, Paris, France

No Drawing. Application April 6, 1949, Serial No. 85,938. In France April 15, 1948

11 Claims. (Cl. 106—163)

There exist at present various methods for the agglomeration of products such as wood waste, e. g. pulp, saw-dust, shavings, fibre, or again turf, certain vegetable fibres, etc., for making molded articles such as panels.

Certain of these methods allow a satisfactory agglomeration of these products by means of natural or synthetic resins, the polymerisation of which is obtained with heat, the wood or the like material remaining, in principle, unaltered.

The articles obtained in this manner are usually of good quality, but the drawback of these methods lies in the fact that they are expensive, and the substances obtained, which can be compared to industrial plastic materials, reach a cost price which is very near to that of the above mentioned plastic materials.

It has also been proposed, in order to lower the cost price, to use, for agglomeration purposes, the lignin of the wood itself, with pure lignin added, if necessary. In this case the agglomeration is made at more or less high temperatures by using comparatively small quantities of the agents which facilitate the said agglomeration.

To this effect it has been proposed in particular to facilitate the agglomeration by the use of phenols, derivatives of phenols, cresols, etc., but the objects, panels, etc., obtained in such a way are not usually sufficiently resistant for practical purposes.

It has also been proposed to use for the same purpose flowers of sulphur, and it has been possible to obtain in this way articles of a certain resistance, but the black color, or at least the very dark color of such articles prevents the panels manufactured in such a way from being used for most purposes, especially for carpenters' work, e. g. the execution of furniture frames, and the like.

The present invention has for its object eliminating these drawbacks and allowing the preparation of agglomerates of wood waste, or similar material, at a very low cost price, of sufficient resistance and of a pleasing appearance which enables it to be used especially in carpenters' work.

For this purpose, the wood or other waste is, according to this invention, mixed prior to agglomeration which is effected at a given temperature, with sulphur-containing organic products, and especially with thiophen and its homologous substances (methyl-, ethyl-, propyl-, butyl-thiophens, etc., or thiophenic oils.

These thiophens and thiophenic oils are obtained principally by distilling bituminous limestone, schists, slaty rocks or the like with rather high contents of sulphur and of which there are considerable deposits in France and in most other countries.

The thiophenic fractions used are those the boiling points of which range, for instance, between 96° C. and 300° C. under atmospheric pressure, although fractions with higher boiling points, for example between 300° C. and 400° C., can also be used.

It is also possible, in accordance with my invention, to use numerous other organic sulphur-containing bodies and, especially, thioalcohols or mercaptans, alcoyl sulphides, etc. On the other hand, the hydrocarbons in which the organic sulphur-containing products can be carried, if necessary, as a solution, can include double bonds and, in a more general way, the sulphur-containing organic products in question can be used in any suitable solvent.

The products referred to containing organic sulphur as well as their solvents do not have to be refined and I may use, in fact, as confirmed by practical tests, residues of distillation, such as distillation tailings or residues of cracking derived from schist oils or sulphur-containing petroleum; the more or less polymerised or condensed substances and the mineral matter contained in these products, do not, in general, constitute a difficulty for putting the invention to practical execution. In this way, it will be possible to use, without refining, products that at present have no market value.

To put the invention to practical execution, the wood waste can be first treated by diluted mineral acids in a cold or hot state or by hot water under pressure, which produces a hydrolysis and puts the lignin in a favorable condition with a view to producing the desired reaction. As a matter of fact, this hydrolysis is not, in general, indispensable, and in some cases the waste can be submitted directly to the treatment disclosed by the sulphur-containing organic products.

For such a contacting which takes place in appropriate mixers, catalysts and accelerators can be added.

The thiophens and homologues can be pure or diluted in hydrocarbons preferably of the aromatic series, but any other hydrocarbon, including a ring, or otherwise, can be used.

They can also be used in the form of sulphonates and the bases of the sulphonates can be of any nature; in the case of heavy metals, this forms also a protection for the wood, as these products can act as fungicides and insecticides.

The sulphur-containing organic body can be caused to act in one or several stages; the total quantity put to action may remain the same or it can vary. They can be added to the synthetic or natural resins in the methods operating with resins; within certain limits, they lead to a reduction of the necessary percentage of these resins without reducing the grade of the finished products.

I can also associate the use of organic sulphur in accordance with the invention, with the use of flowers of sulphur, according to already known methods, which allows to obtain harder products at the same temperature, which products have the appearance of ebonite and its hardness, or else products which are less colored but just as strong as in the case where mineral sulphur alone is used at a higher temperature.

In accordance with the invention, I can also associate the use of organic sulphur with the use of synthetic resins which renders it possible to obtain products just as good-looking as those obtained with only synthetic resins, while reducing the percentage of synthetic resins employed and, consequently, the cost price.

The mixture of wood waste and organic sulphur having thus been effected, the mass resulting therefrom is put under a pressure of between 10 and 50 kg. per square cm., for example, according to what degree of hardness is required from the finished articles, and at a temperature of between 160 and 255° C. inside e. g. a press incorporating a heated plate, the heating being obtained through any known or suitable means. The duration of the heating is variable and depends on the wood that is being treated and on its degree of dryness, on the temperature of treatment, on the nature of the thiophenic hydrocarbons used, and, finally, on the degree of hardness that one wishes to obtain for the molded products or panels. On an average, the duration of heating ranges between 5 and 40 minutes and more often between 10 and 15 minutes, without any catalysts or accelerators.

An agglomerate is then obtained of a hardness which varies according to the percentage of thiophenic products employed, to the pressure, to the temperature and to the length of time it has remained under pressure.

Instead of mixing the wood waste and the organic sulphur in a cold state and then compressing the mixture in a press with heated plates, it is also possible, according to my invention, to prepare the said mixture under hot conditions, at the temperatures indicated above, and to compress it subsequently in a press which, according to this procedure, does not have to be heated. With this method, the pressure can be applied continuously as between strips or rolls, etc.

The maximum pressure and temperature produce hard water-repelling articles which are similar to plastic materials; the minimum pressure and temperature produce comparatively soft articles, less water-repelling than the former, in which the natural characteristics of the wood are better preserved.

The agglomerated products obtained can very easily be worked with the tools usually employed in the wood industry; they can be painted, lacquered or polished in the same way as ordinary wood, they can likewise be covered with synthetic or the like resins, or also metal-coated by, for example, spraying molten metal over them. The surface obtained is smooth; finally, panels intended for furniture can be decorated and layers superimposed locally by molding on the panels themselves so as to strengthen the panels considered.

According to the invention, in order to harden the surface of the panels, a certain quantity of thiophenic and homologous hydrocarbons can be sprayed, before compression, onto the mixture in the mold; in this manner the water-repelling properties are increased.

I may also, according to the invention, make use of the fact that the products added to the wood waste are very fluid and very penetrating, and consequently strengthen certain parts of the article that is to be molded by spraying these parts with a certain quantity of the said thiophenic and homologous products. I may also, with a view to strengthening it, increase the specific weight of the molded object by placing more mixture on the part to be strengthened. Finally, veneer obtained by unrolling or by chopping off can be glued on one side or on both sides at the same time as the pressing is being performed; to this purpose it is sufficient to coat them, by means of a spray gun for instance, with thiophenic or homologous oils.

Some examples are given below of different manners of applying the method according to the invention.

*1st example.*—1 kg. of sawdust containing 15% moisture is stirred for 10 minutes in a blade mixer identical to those used in chemical industry for the mixing of pasty material, with 10%, i. e. 100 gr. of aromatic hydrocarbons containing butyl-thiophen and having the following properties:

$d$ at 15° C.=0.912.
Boiling point: 170° C. under atmospheric pressure.
Contents of sulphur: 14 to 15%.
Contents of butyl-thiophen: 65%.

This butyl-thiophen is obtained, for example, through heat treatment of bituminous limestone or schists or from the distillation of certain hydrocarbons containing sulphur.

After having been stirred, the mixture is poured into a mold which is placed between the plates of a heated press, and it remains compressed for several seconds under a pressure of 50 kg./cm.$^2$, so as to expel the air. The pressure is reduced to 10 kg./cm.$^2$ and the material is heated by increasing the pressure progressively so as to eliminate the water in the form of steam.

The increase in pressure and the heating are controlled in such a way that ten minutes after the elimination of water in the form of steam, the material contained in the mold reaches a temperature of 200 to 230° C. and remains under a pressure of 50 kg./cm.$^2$.

After lifting, a panel of 300 x 300 mm. is obtained, 6 to 8 mm. thick, of a light color, fairly soft and easy to work.

It is advisable, as a general rule, to place the panels which come out of the press, in a thermically insulated enclosure; in this way, warping is avoided and a greater hardness and cohesion are obtained.

It has been remarked that, as a general rule, the finished panels, similarly, as a matter of fact, to all glued or agglomerated panels, continue hardening several days after they are taken out of the press.

*2nd example.*—1 kg. of sawdust at 20% moisture is stirred for 10 minutes as in the first example, with 10%, i. e. 100 gr. aromatic hydrocarbons containing amyl-thiophen and hexyl-thiophen and having the following properties:

d at 15° C.=1.
Boiling point: 220/220° C. under atmospheric pressure.
Contents of sulphur: 12 to 16%.
Contents of homologues of thiophen: about 60%.

This product, the same as in Example 1, is obtained through heat treatment of bituminous limestone or schists or through the distillation of certain sulphur-containing hydrocarbons.

After eliminating the water in the form of steam, as in the above example, the material forming the mixture is heated in such a way as to reach in 15 minutes a temperature of 250/255° C. under a pressure of 50 kg./cm.$^2$.

When taking the material out of the mold, a panel of 300 x 300 mm., 5 to 6 mm. thick, is obtained with a specific weight slightly above 1, of a darker color than in the preceding case. It is hard and very strong and can be worked in the same way as wood.

*Example 2a.*—With 20%, i. e. 200 gr. of the same hydrocarbon mixture and under the same conditions of temperature and pressure, a harder and stronger panel is obtained which can still be easily worked.

*Example 2b.*—With 10% or 20%, i. e. 100 gr. or 200 gr. of the same mixture, but maintained under pressure for 20 to 30 minutes, darker panels are obtained, that are still harder and stronger than the preceding ones. These panels can again be worked with the usual wood-working tools.

*Example 2c.*—Under the same conditions as above, but with temperature and pressure increased to 260° C. and 60 kg./cm.$^2$, extremely hard panels are obtained, and for working them, the ordinary wood-working tools cannot be used.

*3rd example.*—1 kg. of shavings with 20% moisture are stirred for 10 minutes as in the preceding examples, with 10%, i. e. 100 gr. hydrocarbon containing hexyl-thiophen and octyl-thiophen and showing the following properties:

d at 15° C.=1.
Boiling point: 220/240° C.
Contents of sulphur: 14 to 16%.
Contents of homologues of thiophen: about 60%.

After stirring for 10 minutes, the mixture is left to settle. The next day it is again mixed with 3% of the same hydrocarbon.

After pressing and heating under the same conditions as in the preceding examples, a panel of 300 x 300 mm. is obtained, 7 to 8 mm. thick, and having a specific weight higher than or equal to 1.

A modification in the thiophenic hydrocarbon selected and/or the temperature, the pressure and the duration of the pressure, as in the examples above, produces panels the characteristics of which vary in the same manner as in said examples.

Characteristic properties of the panels obtained:

*Moisture.*—The percentage of moisture of the panels when taken out of the press ranges between 2 and 3%. In the panels obtained in Example 1, this percentage of moisture ranges between about 7 and 8%, which seems to be normal in European climate, as appears from inspection of the curves of hydroscopic equilibrium of the wood in relationship with the temperature and the hygrometric state of room atmosphere; this percentage is slightly lower than that of the original wood under the same conditions.

With regard to panels obtained in Example 2 and the following examples, the moisture contents reabsorbed is practically zero after 30 to 40 days.

*Behaviour in water.*—The panels of Example 1 cannot undergo an immersion test. The panels of Example 2 and the following examples, when placed in water for 72 hours, absorb less than 15% of their weight in water without any substantial swelling.

*Resistance to traction.*—The breaking load for the panels of Example 2 is about 70 kg./cm.$^2$.

*Resistance to flexion.*—The breaking load for the panels of Example 2 is about 200 kg./cm.$^2$. It is higher for the panels described in Examples 2a, 2b and 2c.

Naturally a number of modifications can be brought to the execution of the method described above, without thereby widening the scope of the present invention as defined in accompanying claims.

What I claim is:

1. In the agglomeration of particles of wood and the like lignin-containing material, the steps consisting in agglomerating the particles with a mixture incorporating at least 25% of a substance selected from the group consisting of thiophen and its alkyl-substituted derivatives in which the carbon atoms of the alkyl group do not exceed eight in admixture with a liquid hydrocarbon and heating and pressing the agglomerated material into the desired shape.

2. In the agglomeration of particles of wood and the like lignin-containing material, the steps consisting in agglomerating the particles with a mixture incorporating at least 25% of a substance selected from the group consisting of thiophen and its alkyl-substituted derivatives in which the carbon atoms of the alkyl group do not exceed eight in admixture with a liquid aromatic hydrocarbon and heating and pressing the agglomerated material into the desired shape.

3. In the agglomeration of particles of wood and the like lignin-containing material, the steps consisting in agglomerating the particles with a mixture incorporating at least 25% of a substance selected from the group consisting of thiophen and its alkyl-substituted derivatives in which the carbon atoms of the alkyl group do not exceed eight in admixture with flowers of sulphur and a liquid hydrocarbon and heating and pressing the agglomerated material into the desired shape.

4. In the agglomeration of particles of wood and the like lignin-containing material, the steps consisting in agglomerating the particles with a mixture incorporating at least 25% of a substance selected from the group consisting of thiophen and its alkyl-substituted derivatives in which the carbon atoms of the alkyl group do not exceed eight in admixture with a synthetic resin and a liquid hydrocarbon and heating and pressing the agglomerated material into the desired shape.

5. In the agglomeration of particles of wood and the like lignin-containing material, the steps consisting in hydrolyzing said particles, agglomerating the hydrolyzed particles with a mixture incorporating at least 25% of a substance selected from the group consisting of thiophen and its alkyl-substituted derivatives in which the carbon atoms of the alkyl group do not exceed eight in admixture with a liquid hydrocarbon and heating and pressing the agglomerated material into the desired shape.

6. In the agglomeration of particles of wood and the like lignin-containing material, the steps consisting in agglomerating the particles with a mixture incorporating at least 25% of a substance selected from the group consisting of thiophen and its alkyl-substituted derivatives in which the carbon atoms of the alkyl group do not exceed eight in admixture with a liquid hydrocarbon, heating at a temperature ranging between about 165 and 260° C., and pressing the agglomerated material into the desired shape under a pressure ranging between 10 and 50 kg. per sq. cm. for about 5 to 40 minutes.

7. In the agglomeration of particles of wood and the like lignin-containing material, the steps consisting of agglomerating the particles with a mixture incorporating at least 25% of a substance selected from the group consisting of thiophen and its alkyl-substituted derivatives in which the carbon atoms of the alkyl group do not exceed eight in admixture with a liquid hydrocarbon including double bonds and heating and pressing the agglomerated material into the desired shape.

8. In the agglomeration of particles of wood and the like lignin-containing material, the steps consisting in agglomerating the particles with an unrefined raw oil including at least 25% in weight of a substance selected from the group consisting of thiophen and its lower alkyl-substituted derivatives in which the carbon atoms of the alkyl group do not exceed eight and heating and pressing the agglomerated material into the desired shape.

9. In the agglomeration of particles of wood and the like lignin-containing material, the steps consisting in agglomerating the material with a raw distillation residuum produced in the treatment of sulphur-containing hydrocarbons and including at least 25% in weight of a substance selected from the group consisting of thiophen and its lower alkyl-substituted derivatives in which the carbon atoms of the alkyl group do not exceed eight and heating and pressing the agglomerated material into the desired shape.

10. By way of a novel article of manufacture, a mass constituted by particles of wood and the like lignin-containing material agglomerated with a mixture incorporating at least 25% of a substance selected from the group consisting of thiophen and its alkyl-substituted derivatives in which the carbon atoms of the alkyl group do not exceed eight in admixture with a liquid hydrocarbon.

11. By way of a novel article of manufacture, a mass constituted by particles of wood or the like lignin-containing material agglomerated with a solution in a liquid aromatic hydrocarbon of at least 25% of a substance selected from the group consisting of thiophen and its alkyl-substituted derivatives in which the carbon atoms of the alkyl group do not exceed eight.

JEAN PAUL JUSTIN SERRES.

References Cited in the file of this patent

UNITED STATES PATENTS

| Number | Name | Date |
|---|---|---|
| 201,274 | Morel | Mar. 12, 1878 |
| 568,318 | Morhard | Sept. 22, 1896 |
| 933,145 | Weckerly | Sept. 7, 1909 |
| 942,505 | Kirkham | Dec. 7, 1909 |
| 1,464,482 | Henderson | Aug. 7, 1923 |
| 2,298,017 | Loughborough | Oct. 6, 1942 |
| 2,486,601 | Irwin | Nov. 1, 1949 |
| 2,490,078 | Meiler | Dec. 6, 1949 |
| 2,507,465 | Ayers | May 9, 1950 |

OTHER REFERENCES

Page 58 of Warnes "Coal Tar Distillation," 3rd ed., 1924.